United States Patent
Masuda et al.

(10) Patent No.: US 8,590,668 B2
(45) Date of Patent: Nov. 26, 2013

(54) CONSTRUCTION MACHINE WITH CAB NOISE REDUCTION DEVICE

(75) Inventors: Kyoko Masuda, Kobe (JP); Yasumasa Kimura, Kobe (JP); Kazuhiro Ueda, Hiroshima (JP)

(73) Assignees: Kabushiki Kaisha Kobe Seiko Sho, Kobe-shi (JP); Kobelco Construction Machinery Co., Ltd., Hiroshima-shi (JP)

( * ) Notice: Subject to any disclaimer, the term of this patent is extended or adjusted under 35 U.S.C. 154(b) by 223 days.

(21) Appl. No.: 13/062,871

(22) PCT Filed: Sep. 8, 2009

(86) PCT No.: PCT/JP2009/065630
§ 371 (c)(1),
(2), (4) Date: Mar. 8, 2011

(87) PCT Pub. No.: WO2010/038585
PCT Pub. Date: Apr. 8, 2010

(65) Prior Publication Data
US 2011/0162908 A1    Jul. 7, 2011

(30) Foreign Application Priority Data
Sep. 30, 2008    (JP) ................. 2008-254626

(51) Int. Cl.
*F01N 5/00*    (2006.01)
*B64F 1/26*    (2006.01)
*G10K 11/04*    (2006.01)
*F02B 77/13*    (2006.01)
*B60N 2/00*    (2006.01)
*B60N 3/00*    (2006.01)

(52) U.S. Cl.
USPC ........... 181/211; 181/200; 181/204; 181/210; 296/190.07; 296/190.09

(58) Field of Classification Search
USPC ......................... 181/211, 210, 200
See application file for complete search history.

(56) References Cited

U.S. PATENT DOCUMENTS 4,445,584 A * 5/1984 Kimura et al. ............ 180/69.22
4,496,188 A * 1/1985 Ezell et al. ............... 296/190.07
(Continued)

FOREIGN PATENT DOCUMENTS

CN    1874913 A    12/2006
EP    806525 A2 * 11/1997 ............... E02F 9/08
(Continued)

OTHER PUBLICATIONS

International Search Report Issued Dec. 22, 2009 in PCT/JP09/065630 filed Sep. 8, 2009.
Combined Chinese Office Action and Search Report Issued Nov. 19, 2012 in Patent Application No. 200980139606.0.

*Primary Examiner* — David Warren
*Assistant Examiner* — Christina Russell
(74) *Attorney, Agent, or Firm* — Oblon, Spivak, McClelland, Maier & Neustadt, L.L.P.

(57) ABSTRACT

A construction machine capable of effectively reducing noise which would intrude into a cab, without deterioration in ride quality, comfort and air-conditioning efficiency in the cab is provided. The construction machine includes a lower propelling body, an upper slewing body including an upper frame, a cab including a floor plate and installed on the upper frame, and a cab noise reduction device. The cab noise reduction device includes: the floor plate; an under-cab member including a cab deck supporting the cab and provided under the cab to define a closed-form under-cab space whose periphery is substantially closed, in cooperation with the floor plate; and a resonator reducing noise in the under-cab space by a resonance effect.

9 Claims, 9 Drawing Sheets

(56) References Cited

U.S. PATENT DOCUMENTS

| | | | | |
|---|---|---|---|---|
| 5,906,411 | A * | 5/1999 | Stauffer et al. | 296/190.11 |
| 5,911,624 | A * | 6/1999 | Stauffer | 454/158 |
| 5,984,036 | A * | 11/1999 | Higuchi et al. | 180/89.12 |
| 6,332,509 | B1 * | 12/2001 | Nishikawa et al. | 181/207 |
| 6,550,571 | B1 * | 4/2003 | Kimura et al. | 181/200 |
| 7,665,801 | B2 * | 2/2010 | Lee | 296/193.03 |
| 2006/0170251 | A1 * | 8/2006 | Ishii et al. | 296/190.09 |
| 2007/0144827 | A1 * | 6/2007 | Shuttleworth et al. | 181/210 |
| 2008/0196949 | A1 * | 8/2008 | Chirpaz et al. | 180/53.4 |

FOREIGN PATENT DOCUMENTS

| | | | |
|---|---|---|---|
| JP | 61 188660 | 11/1986 | |
| JP | 3 59223 | 6/1991 | |
| JP | 8 81976 | 3/1996 | |
| JP | 2003 82705 | 3/2003 | |
| JP | 2003082705 A * | 3/2003 | E02F 9/08 |
| JP | 2003 268805 | 9/2003 | |
| JP | 2006077640 A * | 3/2006 | |

* cited by examiner

FIG. 17
PRIOR ART

CONSTRUCTION MACHINE WITH CAB NOISE REDUCTION DEVICE

TECHNICAL FIELD

The present invention relates to a construction machine, such as a hydraulic shovel, which comprises a cab and a cab noise reduction device for suppressing the intrusion of noise into the cab.

BACKGROUND ART

The background art of the present invention will be described by taking a hydraulic shovel as an example.

Figure 14:
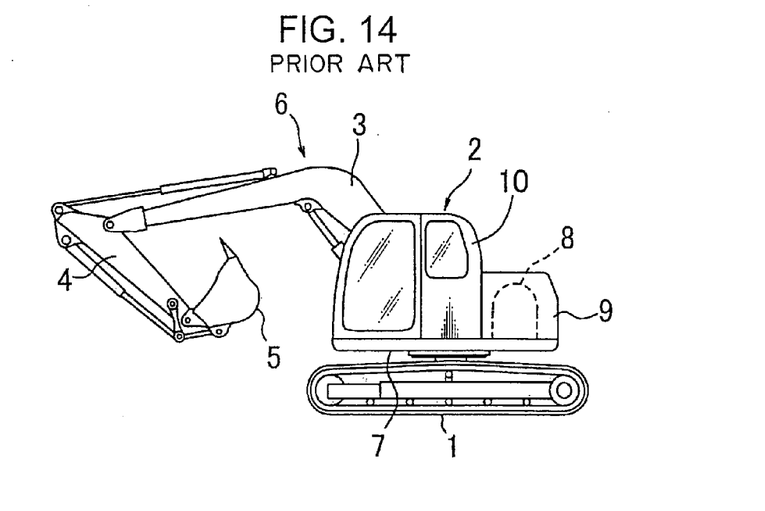
FIG. 14 is a schematic side view of a hydraulic shovel which is one example of a subject matter of the present invention.

FIG. 14 shows a hydraulic shovel which is a conventional construction machine. This hydraulic shovel comprises a crawler type lower propelling body 1, an upper slewing body 2 mounted on the lower propelling body 1 slewably about a vertical axis thereof, and an attachment 6 attached to the upper slewing body 2, wherein the attachment 6 includes a boom 3, an arm 4 and a bucket 5.

The upper slewing body 2 includes an upper frame 7 as a base, which has a rear portion on which an engine room 9 for accommodating an engine 8 therein is provided, and a front portion on which a cab 10 is installed to allow an operator to perform various operations thereinside. In this specification, each of the terms "front (frontward)", "rear (rearward)", "left (leftward)" and "right (rightward)" means a direction as viewed from an operator seated in the cab 10.

Figure 15:
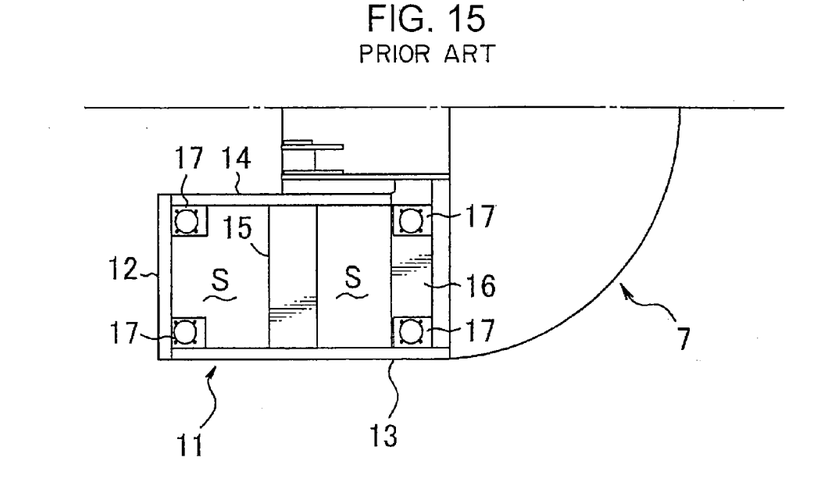
FIG. 15 is a fragmentary top plan view of a conventional upper frame constituting the hydraulic shovel and including a cab deck.
Figure 16:
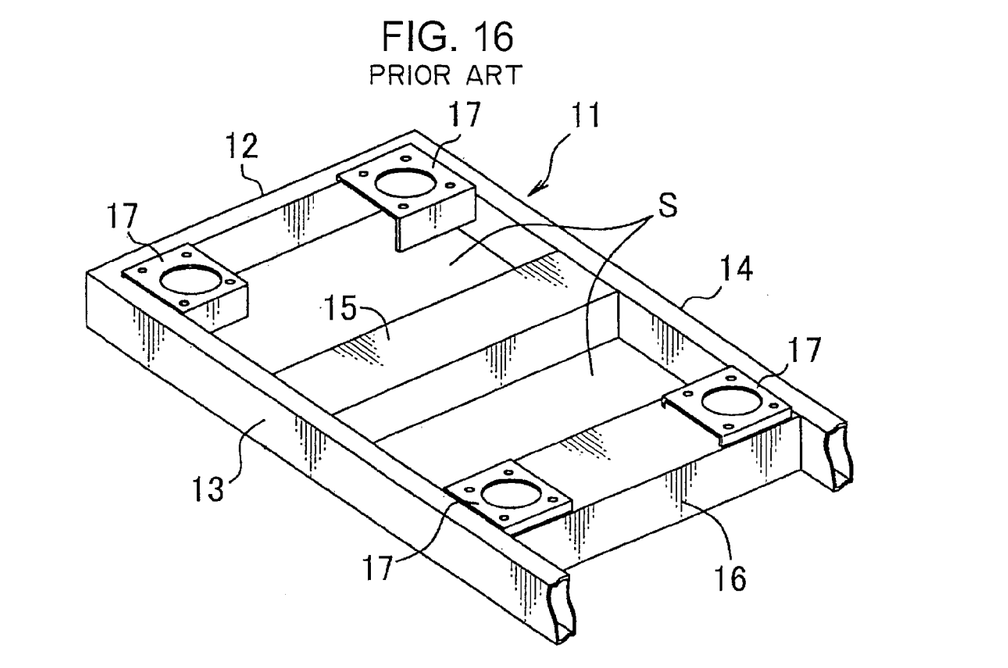
FIG. 16 is a perspective view of the cab deck shown in FIG. 15.
Figure 17:
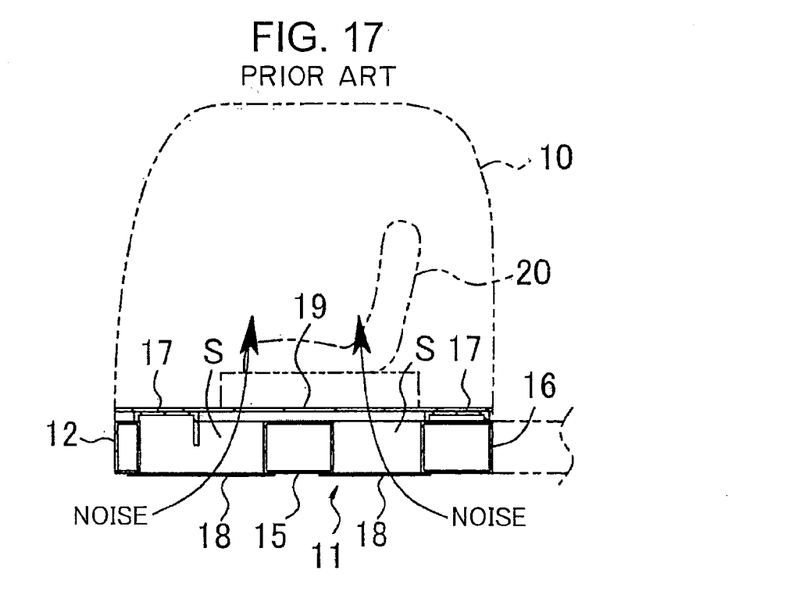
FIG. 17 is a sectional side view of an under-cab member including the cab deck shown in FIG. 15.

FIGS. 15 to 17 show an arrangement around the upper frame 7 and the cab 10.

The upper frame 7 includes a cab deck 11, on which the cab 10 is installed. The cab deck 11 has a front frame 12 extending widthwise of the hydraulic shovel, a left frame 13 and a right frame 14 connected to respective ones of left and right ends of the front frame 12, and two transverse frame 15, 16 disposed rearward of the front frame 12 while being offset with respect to each other in a frontward-rearward direction so as to couple the left and right frames 13, 14 together, the cab deck 11 being formed in a generally ladder structure as a whole. The cab deck 11 has right and left corners on opposite sides of front and rear ends, i.e., four corners, which have respective inner surfaces to which four mounting seats 17, - - - are attached respectively. Onto the mounting seats 17, - - - are attached non-illustrated four cab mounting members respectively. The cab 10 is supported on the cab mounting members.

The cab deck 11 has a lower surface, to which front and rear undercovers 18 shown in FIG. 17 are attached so as to close an opening defined between the front frame 12 and the front transverse frame 15 and an opening defined between the front and rear transverse frames 15, 16, from lower side thereof, respectively. The cab 10 includes a floor plate 19 constituting a floor of the cab 10, the floor plate 19 closing the openings from thereabove. The cab 10 is provided with a cab seat 20 shown in FIG. 17 therein.

The cab deck 11 and the undercovers 18 and 18 are thus disposed under the floor plate 19 of the cab 10, surrounding two under-cab spaces S and S located on front and rear sides of the transverse frame 15 respectively. Each of the under-cab spaces S and S is a closed space whose periphery is substantially closed, allowing a hydraulic pipe, a wiring and the like to be passed through the under-cab spaces S and S. The cab deck 11 including the mounting seats 17, and the undercovers 18 and 18, constitute an "under-cab member" disposed under the cab 10.

While, as mentioned above, each of the under-cab spaces S and S is fundamentally a closed space whose periphery is closed, each of the floor plate 19, the cab deck 11 and the undercovers 18 and 18 are, strictly, provided with a through-hole for draining water and a through-hole for passing the hydraulic pipe. These holes allow the under-cab spaces S and S to communicate with an outside of the hydraulic shovel and an inside of the cab 10, and therefore permit operating noise, such as engine noise, pump noise and fan noise, to intrude into the cab 10 from the outside via the under-cab spaces S and S, thus causing an operator to feel uncomfortable.

As means for preventing the intrusion of noise into a cab, there have been known techniques disclosed in the following Patent Documents 1 and 2.

The technique disclosed in the Patent Document 1, JP 8-81976A includes providing a space isolation layer inside a cab with respect to each of a floor and a roof thereof. Each of the space isolation layers reduces a real height of the internal space of the cab to thereby heighten a resonance frequency of the internal space of the cab, while functioning as a noise-absorbing air layer interposed between the space isolation layer and an outer panel.

On the other hand, the technique disclosed in the Patent Document 2 JP 2003-268805A includes providing a sound release hole in a peripheral wall (e.g., a pillar) of a cab to let a back-pressure inside a cab therethrough.

In addition, there has been known a technique disclosed in the following Patent Document 3, JP-U 3-59223A, as a publicly known technique for suppressing noise not intruding into a cab but released outside a machine. This technique includes a box-shaped member which constitutes an upper frame, the box-shaped member provided with an opening and a neck portion to thereby form a resonator. This resonator has a resonance effect which can reduce low-frequency noise particularly.

The above publicly known techniques, however, have the following problems. The technique described in the Patent Document 1 involves a reduction in the real height of the internal space of the cab, which deteriorates ride quality and comfort of the cab. The technique described in the Patent Document 2 involves that the sound release hole for positively communicating between an inside and an outside of the cab would lower air-conditioning efficiency. The technique described in the Patent Document 3 is incapable of suppressing the intrusion of noise into a cab.

It is an object of the present invention to provide a construction machine comprising a cab noise reduction device capable of effectively reducing noise intruding into a cab, without involving deterioration in ride quality, comfort and air-conditioning efficiency in the cab. This construction machine comprises: a lower propelling body; an upper slewing body including an upper frame and slewably mounted on the lower propelling body; a cab including a floor plate and being installed on the upper frame; and a cab noise reduction device. The cab noise reduction device comprises: the floor plate; an under-cab member which includes a cab deck supporting the cab and is provided under the cab to thereby define a closed-form under-cab space whose periphery is substantially closed, in cooperation with the floor plate; and a resonator which is provided in the under-cab space and reduces noise intruding into the under-cab space, by a resonance effect.

DESCRIPTION OF EMBODIMENTS

With reference to FIGS. 1 to 13, there will be described various embodiments according to the present invention. The following embodiments are examples where the present invention is applied to the aforementioned type of hydraulic shovel shown in FIG. 14. The specific structure of the hydraulic shovel according to each of the following embodiments is common to the conventional structure shown in FIGS. 15 to 17, in the following points A to D.

A. The upper frame 7 shown in FIG. 14 includes a cab deck 11, on which a cab 10 is installed.

B. The cab deck 11 includes a front frame 12, a left frame 13 and a right frame 14 which frames are assembled together to form a box structure, and front and rear transverse frames 15 and 16, the entire cab deck 11 being formed into a generally ladder structure. The cab deck 11 has four corners on right and left sides of front and rear ends, the ends having respective inner surfaces to which four mounting seats 17, - - - are provided respectively. Onto each of the mounting seats 17, - - -, there are attached non-illustrated respective four cab mounting members, on which the cab 10 is supported.

C. The cab deck 11 has a lower surface, to which two undercovers 18 and 18 are so attached as to close an opening between the front frame 12 and the front transverse frame 15, and an opening between the two transverse frames 15 and 16, from lower side thereof, respectively. The cab 10 shown in FIG. 14 includes a floor plate 19 constituting a floor of the cab 10 and closing the openings from upper side thereof.

D. The cab deck 11, the undercovers 18 and 18 and the floor plate 19 define two under-cab spaces S and S under the cab 10. Each of the under-cab spaces S and S is a substantially closed space in a frontward-rearward direction, a rightward-leftward (widthwise) direction and an upward-downward direction, and a hydraulic pipe, through which spaces a wiring and the like are passed.

The first embodiment will be described while assigning the same reference number or code as that in FIGS. 14 to 17 to the same element or component as that shown in FIGS. 14 to 17, as well as those described in the A to D, and omitting its duplicated description.

Figure 2:
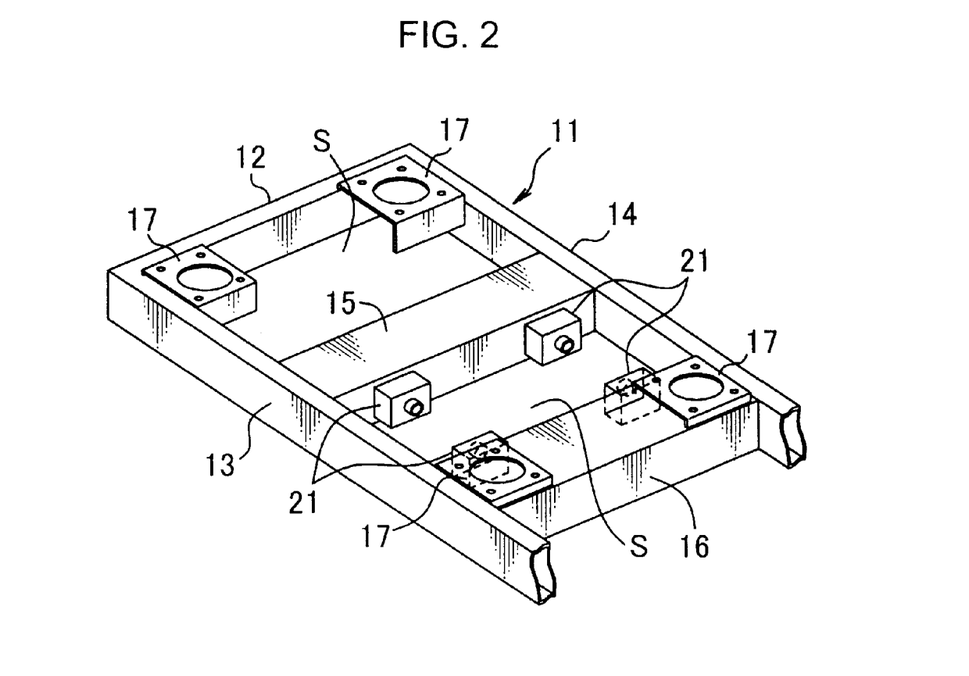
FIG. 2 is a perspective view of the cab noise reduction device.
Figure 3:
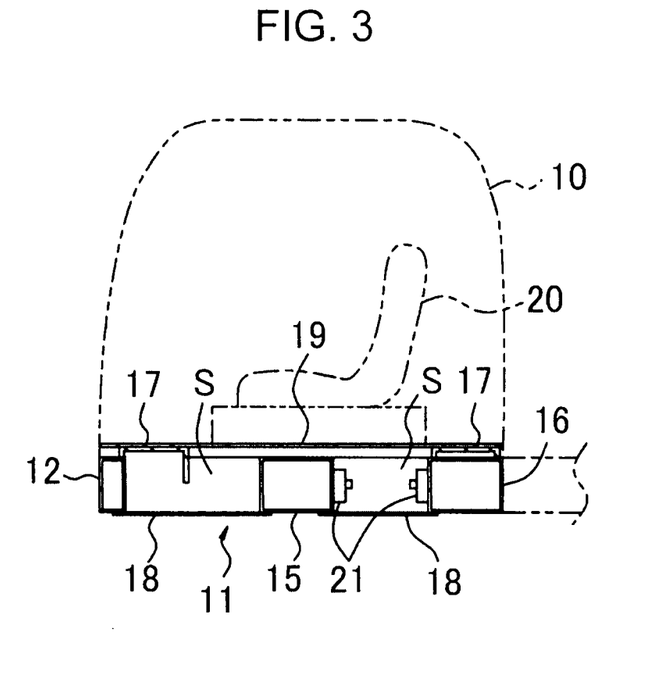
FIG. 3 is a side sectional view of the cab noise reduction device.
Figure 4:
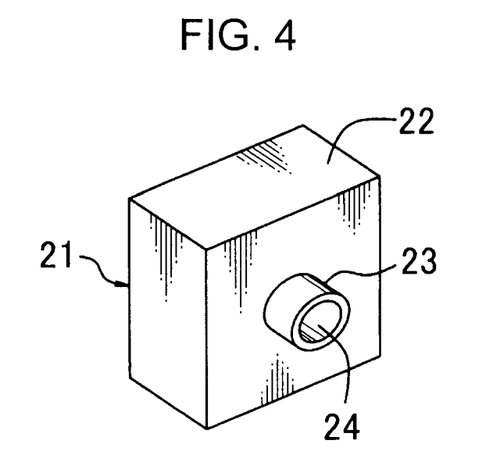
FIG. 4 is a perspective view of a resonator constituting the cab noise reduction device.

FIGS. 1 to 7 show a construction machine according to a first embodiment, which machine comprises a cab noise reduction device including a resonator (also called "Helmholtz-type sound absorber") 21 as shown in FIG. 4. The resonator 21 has a body portion 22, which is a hollow, rectangular parallelepiped-shaped box-like member, and a tubular-shaped neck portion 23. The body portion 22 has a sidewall surrounding an internal space, the sidewall formed with a through-hole at an appropriate position thereof. The neck portion 23 is fixed to the sidewall in such a manner as to surround the through-hole provided in the sidewall of the body portion 22 and protrude outwardly from the sidewall.

The resonator 21 in the first embodiment, having a resonance frequency of 400 Hz or less, for example, 200 Hz, is operable to reduce noise entering into the internal space of the body portion 22 through an opening 24 surrounded by the neck portion 23, by a resonance effect. The frequency of the sound that the resonator 21 can absorb depends on a sound velocity, a cross-sectional area and a length of the neck portion 23, and a volume of the body portion 22. Accordingly, designing dimensions of the respective portions of the resonator 21 section so as to make the frequency equal to a frequency of target noise can provide a sound-absorbing effect on the target noise to the resonator 21. The body portion 22 of the resonator 21 is not limited to the rectangular parallelepiped shape, but may be, for example, a circular cylindrical shape. Besides, it is also permitted that the resonator 21 would not have the neck portion 23 but simply have an opening provided in the sidewall of the body portion 22.

Figure 1:
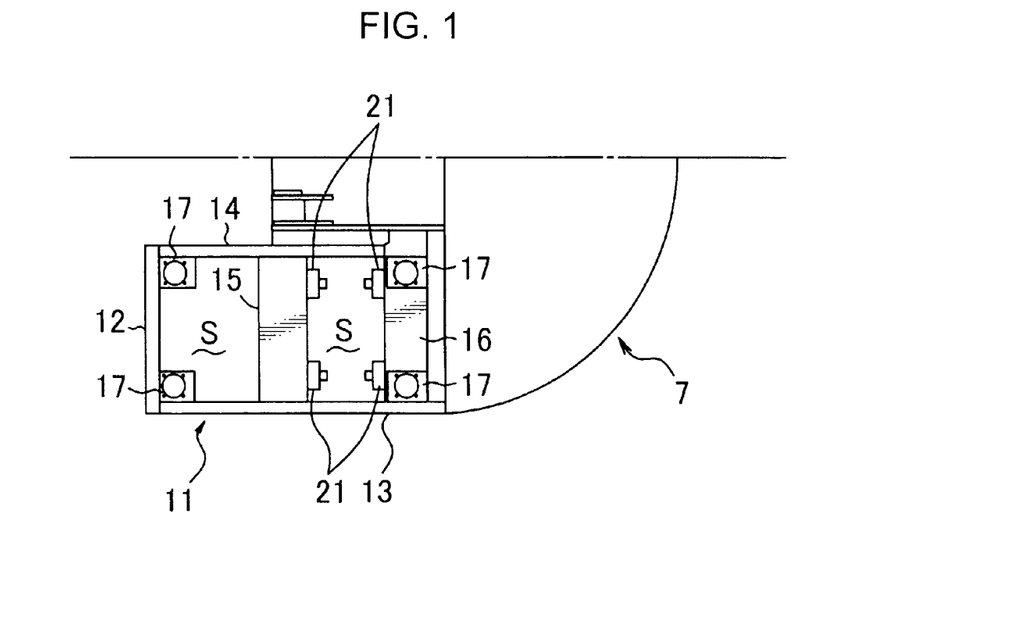
FIG. 1 is a top plan view showing a cab noise reduction device provided in a construction machine according to a first embodiment of the present invention.

The resonator 21 is disposed at an appropriate position within the under-cab space S. In the first embodiment, as shown in FIGS. 1 to 3, the resonator 21 is installed in at least one of (in the illustrated embodiment, each of) right and left opposite ends of opposed wall surfaces of the front and rear transverse frames 15 and 16 constituting the cab deck 11, i.e., four corners of the under-cab space S defined between the two transverse frames 15 and 16, in such a manner that the opening 24 is located in a vicinity of the wall surface and oriented toward the under-cab space S.

The resonator 21 thus installed within the under-cab space S can reduce noise which would intrude from the outside into the cab through the aforementioned through-holes for a hydraulic pipe and others via the under-cab space S, in the under-cab space S. Furthermore, depending on the installation position, the resonator 21 can exert a high noise reduction effect.

Figure 5A:
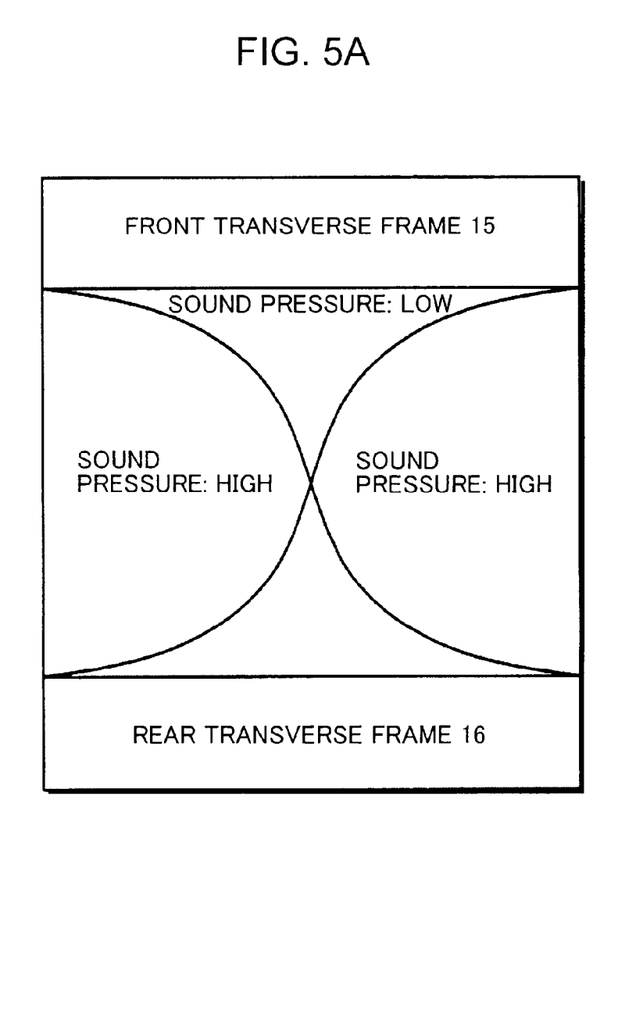
FIG. 5A is a diagram showing a sound pressure distribution at primary resonance in a widthwise direction in an under-cab space of the cab noise reduction device.
Figure 5B:
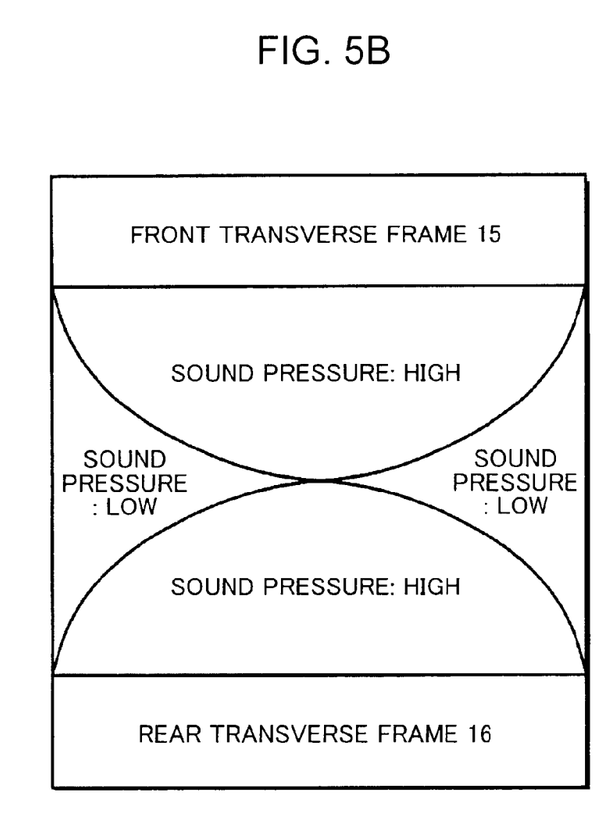
FIG. 5B is a diagram showing a sound pressure distribution at primary resonance in a frontward-rearward direction in the under-cab space.
Figure 6A:
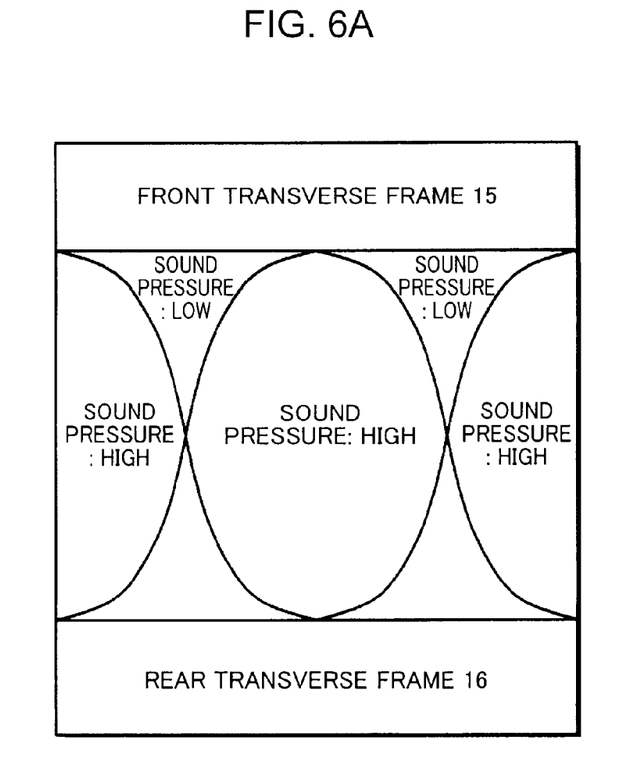
FIG. 6A is a diagram showing a sound pressure distribution at secondary resonance in the widthwise direction in the under-cab space of the cab noise reduction device.
Figure 6B:
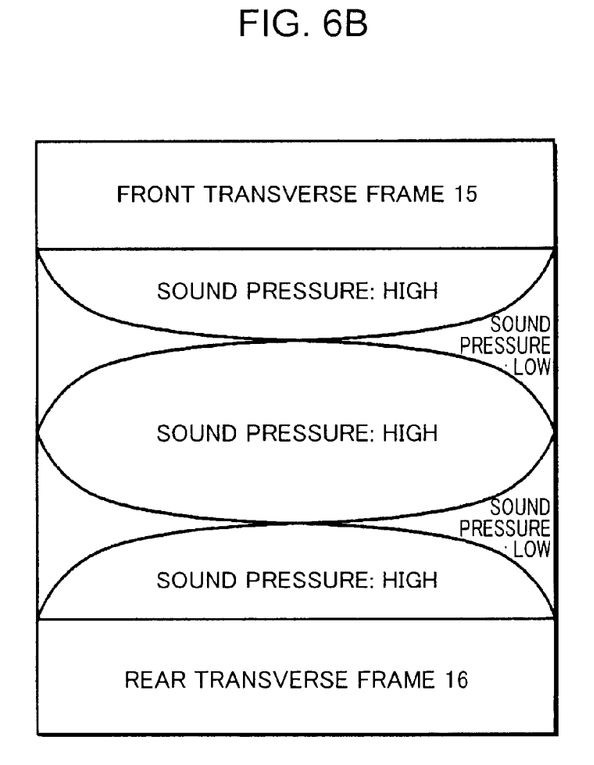
FIG. 6B is a diagram showing a sound pressure distribution at secondary resonance in the frontward-rearward direction in the under-cab space.

This point will be specifically described. FIGS. 5A and 5B show respective sound pressure distributions at primary resonance in the widthwise direction and in the frontward-rearward direction of the cab in the under-cab space S between the front and rear transverse frames 15 and 16; FIGS. 6A and 6B show respective sound pressure distributions at secondary resonance in the widthwise direction and in the frontward-rearward direction of the cab in the under-cab space S. These figures show that, in the under-cab space S defined between the front and rear transverse frames 15 and 16, a maximum sound pressure (anti-node of the sound pressure) at each of primary and secondary resonances appears in each of the ends of the opposed wall surfaces of the two transverse frames 15 and 16, i.e., each of the four corners of the under-cab space S. Therefore, the resonators 21 will be able to effectively suppress a resonance in the under-cab space S to significantly lower the sound pressure, thus reducing noise around operator's ears, when disposed so as to position the opening 24 thereof in the corner corresponding to the position of the anti-node of the sound pressure. Particularly, the four resonators 21 which are disposed in the respective four corners as in the first embodiment can exert a higher noise reduction effect. The resonator 21 may be installed on a wall surface of each of the left and right frame 13 and 14, instead of each of the front and rear transverse frames 15 and 16.

Figure 7:
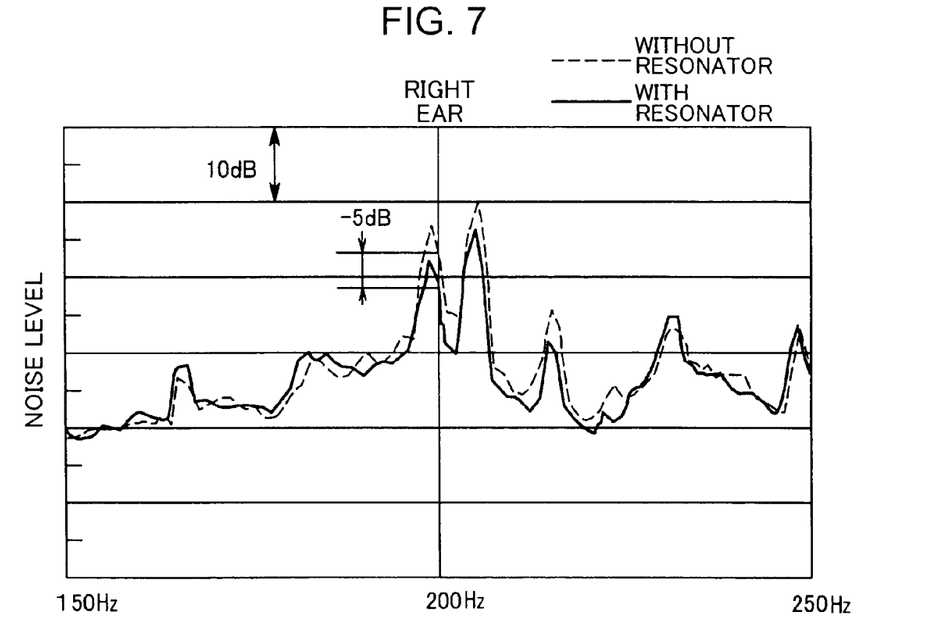
FIG. 7 is a chart showing a test result on a noise reduction effect of the cab noise reduction device.

FIG. 7 shows in result of a test carried out by the inventor to check the noise reduction effect in the first embodiment. In FIG. 7, the thick line indicates a noise level in the first embodiment, while the dashed line indicates a noise level in a hydraulic shovel devoid of the resonator 21. In either case, the body portion 22 of the resonator 21 has a size of 150 mm×150 mm×40 mm, and the neck portion 23 of the resonator 21 has a size of 40 mm in either of a diameter and a length. The test result shown in FIG. 7 indicates that installing four of the resonators 21 in the respective four corners enables a noise level around an operator's right ear during no load to be reduced by about 5 db, on the target frequency of 200 Hz. This noise reduction effect can also be obtained to some extent in the case where the resonator 21 is installed in each of only two of the four corners or installed at a position closer to a center of the transverse frame than to the corner.

Furthermore, as for another frequency of noise, it is possible to obtain a similar noise reduction effect fundamentally, when the dimensions of the body portion 22 and the neck portion 23 are set based on the frequency. However, in the case of hydraulic shovels, it is desirable to set the target frequency to a value of 400 Hz or less, in which frequency the resonance in the cab can perform a great influence.

Figure 8:
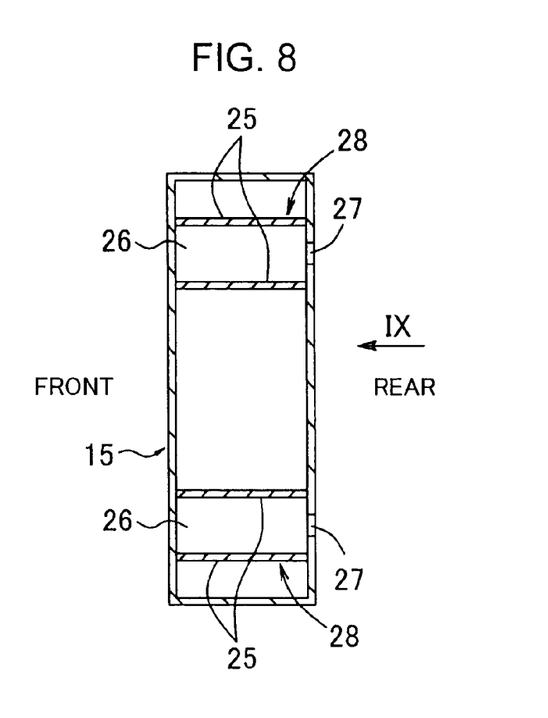
FIG. 8 is a horizontal sectional view of a transverse frame of a cab deck in a second embodiment of the present invention.
Figure 9:
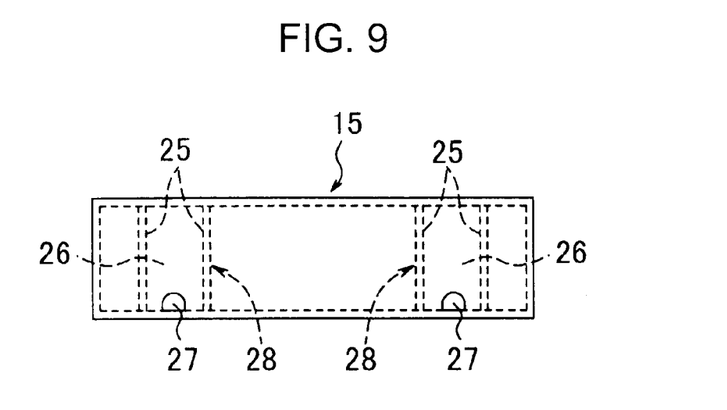
FIG. 9 is a diagram of the transverse frame of the cab deck, when viewed from the arrowed line IX in FIG. 8.

FIGS. 8 and 9 show a second embodiment of the present invention. This embodiment, focusing on a point that each of the front and rear transverse frames 15 and 16 of the cab deck 11 has a widthwisely-long, hollow, box-shaped structure whose periphery is substantially closed, includes forming a resonator by utilization of each of the transverse frames 15 and 16.

In FIGS. 8 and 9, shown is only the front transverse frame 15 representatively, in the two transverse frames 15 and 16. FIG. 8 is a horizontal sectional view of the front transverse frame 15, and FIG. 9 is a diagram (rear view) of the front transverse frame 15, when viewed from the arrowed line IX in FIG. 8.

In the second embodiment, since the transverse frame 15 has a volume too large to form a resonator, there are provided a plurality of (in the illustrated embodiment, four) partition plates 25, - - - inside the transverse frame 15 in side-by-side relation in a longitudinal direction thereof, to thereby define two independent closed spaces 26 and 26 in opposite end regions of an internal space of the transverse frame 15, respectively. Besides, the transverse frame 15 has a sidewall formed with two openings 27 to let each of the closed spaces 26 and 26 communicate with a space outside the transverse frame 15, i.e., the under-cab space S shown in FIGS. 1 to 3. Thus easily formed are two resonators 28 and 28, which comprise respective body portions surrounding the closed spaces 26 and 26 respectively, each the body portion having suitable volume for obtaining a desired noise reduction effect, by utilization of the transverse frame 15. In short, the body portion of each of the resonators 28 and 28 is formed by a combination of the sidewall of the transverse frame 15 and the partition plates 25, - - - .

In the second embodiment, each of the partition plates 25, - - - additionally functioning as a reinforcing member for increasing rigidity and strength of the transverse frame 15, suppresses vibration of the transverse frame 15 itself. In this case, it is preferable that each of the openings 27 and 27 has a shape of including a semi-arc or generally semi-arc (e.g., semi-elliptical) shaped upper peripheral edge and a linear lower peripheral edge aligned with a lower edge of the transverse frame 15 as shown in FIG. 9: this offers an advantage of avoiding significant deterioration in the strength of the transverse frame 15, despite the formation of the openings 27 and 27, facilitating machining of the openings 27 and 27, and preventing accumulation of rainwater inside the transverse frame 15.

The opening 27 may, however, be formed in any other suitable shape, for example, a polygonal shape such as a quadrilateral shape, or a vertically-long or horizontally-long elliptical shape.

Figure 10:
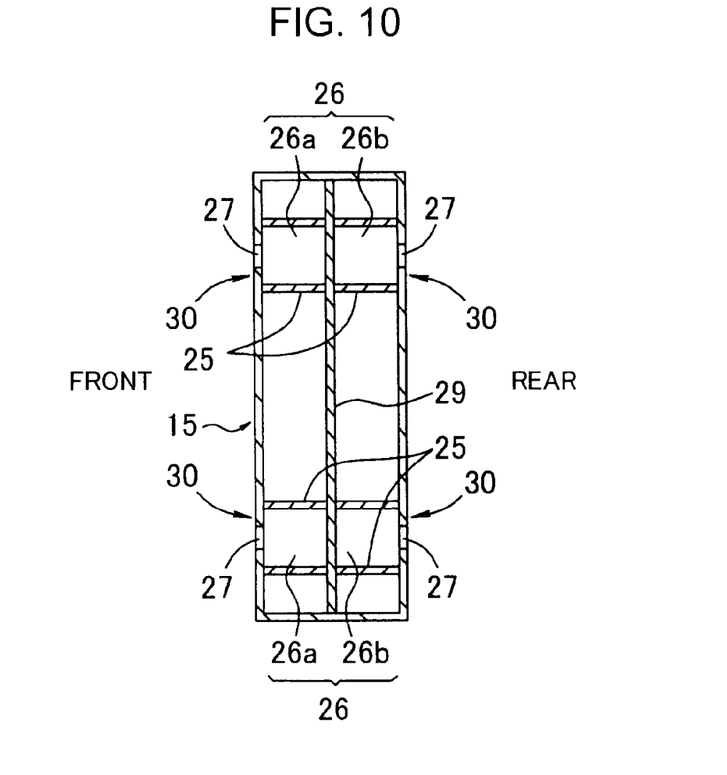
FIG. 10 is a horizontal sectional view of a transverse frame of a cab deck in a third embodiment of the present invention.

FIG. 10 shows a third embodiment of the present invention. This embodiment includes a vertical partition plate 29, in addition to the partition plates 25, - - - : the vertical partition plate 29 is so provided as to extend in the longitudinal direction of the transverse frame 15, i.e., the rightward-leftward direction of the hydraulic shovel, in a vertical posture, while intersecting with the partition plates 25, - - - at a right angle, thereby further partitioning each of the closed spaces 26 and 26 into a front space 26a and a rear space 26b. In association with the respective partitioned spaces, a plurality of openings 27 each opened in the frontward-rearward direction are provided; thus a plurality of resonators 30, - - - are formed. These resonators 30, - - - are capable of lowering sound pressures in both of the two under-cab spaces S and S defined on the front and rear sides of the transverse frame 15 as shown in FIGS. 1 to 3.

Figure 11:
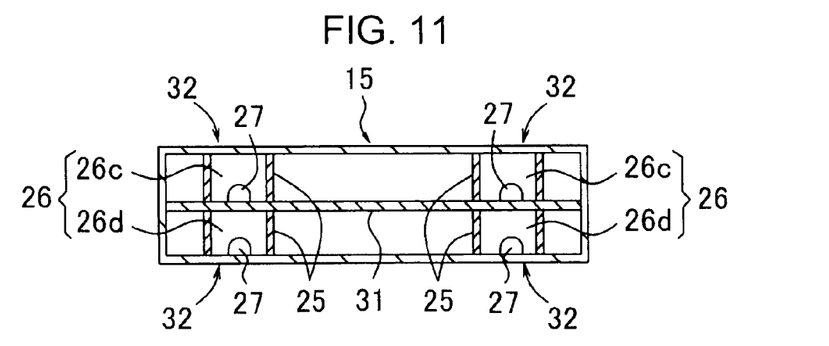
FIG. 11 is a horizontal sectional view of a transverse frame of a cab deck in a fourth embodiment of the present invention.

FIG. 11 shows a fourth embodiment of the present invention. This embodiment includes a horizontal partition plate 31, in addition to the partition plates 25, - - - : the horizontal partition plate 31 is so provided as to extend in the longitudinal direction of the transverse frame 15, i.e., the rightward-leftward direction of the hydraulic shovel, in a horizontal posture, while intersecting with the partition plates 25, - - - at a right angle, thereby further partitioning each of the closed spaces 26 and 26 into an upper space 26c and a lower space 26d. In association with the respective partitioned spaces, a plurality of openings 27 each opened in the frontward-rearward direction are provided; thus a plurality of resonators 32, - - - are formed.

Figure 12:
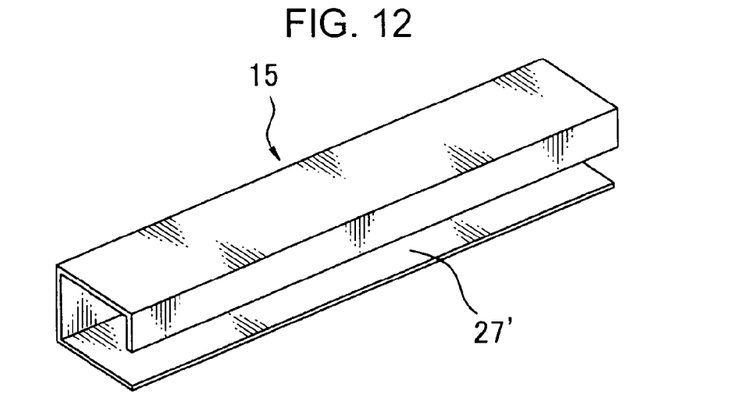
FIG. 12 is a horizontal sectional view of a transverse frame of a cab deck in a fifth embodiment of the present invention.

FIG. 12 shows a fifth embodiment of the present invention. This embodiment includes, in the transverse frame 15 shown in FIG. 8, forming an opening 27' which continuously extends over an entire or approximately entire region in the longitudinal direction thereof, in place of the opening 27 consisting of a locally-formed through-hole in the transverse frame 15. The thus shaped opening 27' also allows the transverse frame 15 to be utilized as a body portion of a resonator.

Figure 13:
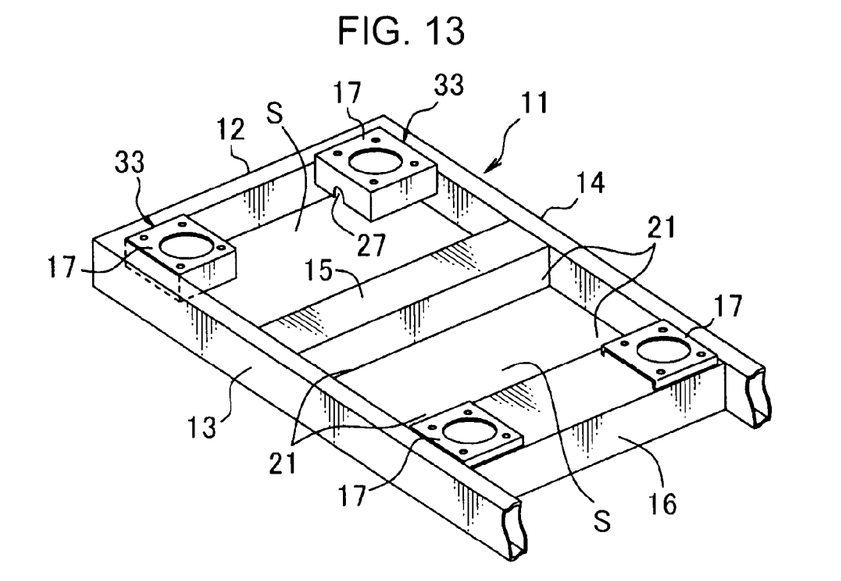
FIG. 13 is a perspective view of a cab noise reduction device in a sixth embodiment of the present invention.

FIG. 13 shows a sixth embodiment of the present invention. This embodiment includes a resonator 33, which has a body portion formed by utilization of at least one of the mounting seats 17, - - - shown in FIG. 2 (in the embodiment shown in FIG. 13, the right and left front mounting seats 17 and 17), in place of or in addition to the resonator 21 in the cab deck 11 shown in FIG. 2. Specifically, the mounting seat 17 is formed in a hollow box-like shape having a top wall and a sidewall extending downwardly from the top wall to face the under-cab space S; the sidewall is provided with an opening 27 at its appropriate position so as to let an inside and an outside of the sidewall communicate with each other.

In the embodiment shown in FIG. 13, the top wall of the mounting seat 17 constituting the resonator 33 is provided with a through-hole for attaching the cab mounting member so as to be also opened outside via the through-hole; however, the mounting seat 17 can sufficiently carry out a function as the body portion of the resonator 33, because the through-hole of the top wall will be closed by the cab mounting member attached to the top wall so as to allow the entire mounting seat to be finally a box-shaped structure whose periphery is substantially closed.

While the resonators 33 shown in FIG. 13 is constituted by only the right and left front mounting seats 17 and 17, the resonator 33 may also be constituted by each of the right and left rear mounting seat 17 and 17, or each of all of the mounting seats 17, - - - .

Fundamentally, the cab noise reduction device in each of the second to sixth embodiments can exert the same effects as those of the cab noise reduction device in the first embodiment.

As above, the present invention provides a construction machine capable of effectively reducing noise which would intrude into a cab, without involving deterioration in ride quality, comfort and air-conditioning efficiency in the cab. The construction machine comprises a lower propelling body, an upper slewing body including an upper frame and slewably mounted on the lower propelling body, a cab including a floor plate and installed on the upper frame, and a cab noise reduction device. The cab noise reduction device comprises: the floor plate; an under-cab member including a cab deck supporting the cab and provided under the cab to define a closed-form under-cab space whose periphery is substantially closed, in cooperation with the floor plate; and a resonator provided in the under-cab space to reduce noise intruding into the under-cab space by a resonance effect.

In this construction machine, defining the under-cab space under the cab and providing the resonator utilizing the resonance effect in the under-cab space makes it possible to lower a sound pressure in the under-cab space and consequently lower a sound pressure in the cab, without influencing ride quality, comfort and air-conditioning efficiency in the cab.

The resonator is preferably formed so as to have a resonance frequency equal to or less than 400 Hz. This resonance frequency provides a high actual advantage in reducing noise in the cab.

The resonator preferably includes: a hollow body portion having a sidewall; and an opening provided in the sidewall of the body portion to let an internal space of the body portion and the under-cab space outside the body portion communicate with each other.

More preferably, the position of the resonator is determined by taking into account of a resonance state in the under-cab space, which enables a sound-absorbing effect based on the resonance effect of the resonator to be enhanced. Specifically, in the under-cab space, a resonance phenomenon specific to dimensions of a space occurs, and a sound pressure becomes higher by the resonance; this resonance mode includes an anti-node having a high sound pressure and a node having a low sound pressure. In the case where the under-cab space is defined between two opposed wall surfaces, there will be occurred a resonance mode in which an anti-node where the sound pressure is maximized exists at a position adjacent to each of the wall surfaces (particularly, in a vicinity of each of opposite ends of the wall surface, i.e., each of four corners of the under-cab space), and several nodes exist at respective positions between the anti-nodes. In this case, the resonator, under the following condition, can weaken the resonance phenomenon to efficiently lower a sound pressure in the entire under-cab space and thus lower a sound pressure around operator's ears in the cab; the condition is that the resonator is disposed at a position corresponding to the anti-node of the sound pressure (for example, a position adjacent to at least one of two or more wall surfaces partially surrounding the under-cab space and facing the position corresponding to the anti-node of the sound pressure, more preferably, a position of at least one of a plurality of corners of the under-cab space at respective ends of the wall surfaces).

In the case where the under-cab member has a hollow box-shaped portion whose periphery is substantially closed, it is possible to form a resonator including the hollow box-shaped portion as the body portion thereof by providing an opening in the hollow box-shaped portion. For example, the under-cab member may include a hollow box-shaped frame extending in a rightward-leftward direction or a frontward-rearward direction of the construction machine, and a partition plate which partitions an internal space of the box-shaped frame into a plurality of spaces to form the body portion in cooperation with the box-shaped frame. The addition of the partition plate makes it possible to easily establish a resonator with a body portion having an optimal volume for obtaining a noise reduction effect at a desired frequency, irrespective of a size of the box-shaped frame. Alternatively, the under-cab member may include a plurality of mounting seats each having a cab mounting member attached thereonto to support the cab from lower side thereof, at least one of the mounting seats being formed into a hollow box shape whose periphery is substantially closed, to form the body portion.

The invention claimed is:

1. A construction machine, comprising:
a lower propelling body;
an upper slewing body including an upper frame and slewably mounted on the lower propelling body;
a cab including a floor plate and being installed on the upper frame;
and a cab noise reduction device, the cab noise reduction device comprising:
the floor plate;
an under-cab member including a cab deck supporting the cab and being provided under the cab to define a closed-form under-cab space whose periphery is substantially closed, in cooperation with the floor plate; and
a Helmholtz resonator provided in the under-cab space to reduce noise intruding into the under-cab space by a resonance effect,
wherein the resonator includes:
a hollow body portion having a sidewall; and
an opening provided in the sidewall of the body portion and being uncovered when the cab is installed on the upper frame, to let an internal space of the body portion and the under-cab space outside the body portion communicate with each other through the opening.

2. The construction machine as defined in claim 1, wherein the resonator is formed so as to have a resonance frequency equal to or less than 400 Hz.

3. The construction machine as defined in claim 1, wherein the under-cab member has a hollow box-shaped portion whose periphery is substantially closed, and wherein an opening is provided in the hollow box-shaped portion to form the resonator including the hollow box-shaped portion as the body portion.

4. The construction machine as defined in claim 3, wherein the under-cab member includes: a box-shaped frame extending in a rightward-leftward direction or a frontward-rearward direction of the construction machine; and a partition plate which partitions an internal space of the box-shaped frame into a plurality of spaces to form the body portion in cooperation with the box-shaped frame.

5. The construction machine as defined in claim 3, wherein the under-cab member includes a plurality of mounting seats each having a cab mounting member attached thereonto to support the cab from lower side thereof, and wherein at least one of the mounting seats is formed into a hollow box shape whose periphery is substantially closed, to form the body portion.

6. A construction machine, comprising:
a lower propelling body;
an upper slewing body including an upper frame and slewably mounted on the lower propelling body;
a cab including a floor plate and being installed on the upper frame;
and a cab noise reduction device, the cab noise reduction device comprising:
the floor plate;
an under-cab member including a cab deck supporting the cab and being provided under the cab to define a closed-form under-cab space whose periphery is substantially closed, in cooperation with the floor plate; and
a resonator provided in the under-cab space to reduce noise intruding into the under-cab space by a resonance effect, wherein the resonator includes:
a hollow body portion having a sidewall; and
an opening provided in the sidewall of the body portion to let an internal space of the body portion and the under-cab space outside the body portion communicate with each other through the opening,
wherein the resonator is disposed so as to locate the opening thereof in at least one of a plurality of positions corresponding to respective anti-nodes of a sound pressure at resonance in the under-cab space.

7. The construction machine as defined in claim 6, wherein the resonator is disposed so as to locate the opening thereof adjacent to at least one of two or more wall surfaces partially defining the under-cab space and facing the anti-nodes of the sound pressure.

8. The construction machine as defined in claim 7, wherein the resonator is disposed so as to locate the opening thereof in at least one of a plurality of corners of the under-cab space at respective ends of the wall surfaces.

9. The construction machine as defined in claim 8, wherein the resonator is disposed at each of a plurality of positions so as to locate the opening in each of all the corners of the under-cab space at the ends of the wall surfaces.

* * * * *